(12) United States Patent
McFadyen et al.

(10) Patent No.: US 7,835,592 B2
(45) Date of Patent: Nov. 16, 2010

(54) CALIBRATION TECHNIQUE FOR HEADS UP DISPLAY SYSTEM

(75) Inventors: Doug McFadyen, Delta (CA); Tatiana Pavlovna Kadantseva, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 940 days.

(21) Appl. No.: 11/550,180

(22) Filed: Oct. 17, 2006

(65) Prior Publication Data

US 2008/0089611 A1 Apr. 17, 2008

(51) Int. Cl.
*G06K 9/00* (2006.01)
*G06K 9/62* (2006.01)
*G06K 9/40* (2006.01)
*G06K 9/36* (2006.01)

(52) U.S. Cl. .................. 382/287; 382/274; 382/289; 382/275; 382/123; 382/215

(58) Field of Classification Search .................. None
See application file for complete search history.

(56) References Cited

U.S. PATENT DOCUMENTS

| | | | |
|---|---|---|---|
| 3,723,805 A | 3/1973 | Scarpino et al. | |
| 4,880,287 A | 11/1989 | Moss | |
| 5,231,481 A | 7/1993 | Eouzan et al. | |
| 5,315,668 A * | 5/1994 | O'Hair | 382/159 |
| 5,499,139 A | 3/1996 | Chen et al. | |
| 5,796,426 A | 8/1998 | Gullichsen et al. | |
| 5,990,941 A | 11/1999 | Jackson et al. | |
| 6,292,171 B1 * | 9/2001 | Fu et al. | 345/156 |
| 6,456,340 B1 * | 9/2002 | Margulis | 348/745 |
| 6,503,201 B1 | 1/2003 | Liu et al. | |
| 6,538,705 B1 * | 3/2003 | Higurashi et al. | 348/745 |
| 6,590,606 B1 * | 7/2003 | Hiller et al. | 348/203 |
| 6,771,423 B2 | 8/2004 | Geist | |
| 6,850,211 B2 | 2/2005 | Deppe | |
| 6,870,532 B2 | 3/2005 | Travers et al. | |
| 6,925,121 B1 * | 8/2005 | Komiya et al. | 375/240.16 |
| 7,343,278 B2 * | 3/2008 | Billinghurst et al. | 703/23 |
| 7,463,293 B2 * | 12/2008 | Chauville et al. | 348/241 |
| 7,529,424 B2 * | 5/2009 | Ahiska | 382/275 |
| 2002/0063802 A1 | 5/2002 | Gullichsen et al. | |
| 2002/0158865 A1 * | 10/2002 | Dye et al. | 345/419 |
| 2003/0030597 A1 | 2/2003 | Geist | |
| 2003/0085848 A1 | 5/2003 | Deppe | |

(Continued)

FOREIGN PATENT DOCUMENTS

EP 0631167 2/2005

(Continued)

*Primary Examiner*—Vikkram Bali
*Assistant Examiner*—Michelle Entezari
(74) *Attorney, Agent, or Firm*—Mark P. Watson (57) ABSTRACT

A method for adjusting an image projected onto a warped surface is provided. The method initiates with capturing calibration points within a calibration image projected onto the warped surface. The method includes analyzing the calibration points to determine relative locations among the calibration points. In one embodiment, the method utilizes a pseudo origin for locating beginning points for successive rows of calibration points. The calibration points are ordered according to the relative locations. The ordered calibration points may be applied to alter the image data prior to projection of the image data onto the warped surface. A system for calibrating points so that an image projected onto a warped surface does not appear as distorted is also provided.

13 Claims, 11 Drawing Sheets

U.S. PATENT DOCUMENTS

| | | |
|---|---|---|
| 2003/0184860 A1 | 10/2003 | Hakkinen |
| 2004/0156080 A1* | 8/2004 | Bernardi et al. ............ 358/3.26 |
| 2004/0156558 A1 | 8/2004 | Kim |
| 2005/0007477 A1 | 1/2005 | Ahiska |
| 2005/0030486 A1* | 2/2005 | Lee et al. ...................... 353/69 |
| 2005/0078378 A1 | 4/2005 | Geist |
| 2005/0083248 A1 | 4/2005 | Biocca et al. |
| 2005/0157398 A1 | 7/2005 | Nagaoka et al. |
| 2005/0195387 A1* | 9/2005 | Zhang et al. ................ 356/138 |
| 2007/0091277 A1* | 4/2007 | Damera-Venkata et al. ... 353/69 |

FOREIGN PATENT DOCUMENTS

| | | |
|---|---|---|
| JP | 2000-357055 | 12/2000 |
| WO | 02073535 | 9/2002 |

\* cited by examiner

CALIBRATION TECHNIQUE FOR HEADS UP DISPLAY SYSTEM

BACKGROUND

In an attempt to enhance safety features for automobiles, heads up displays (HUD) are being offered as an option for purchasers of some automobile models. The virtual image is projected from the instrument panel onto the windshield. As windshields are not flat or perpendicular to the driver's eyes, the image must be corrected to ensure that it is undistorted and easy to read. In some solutions the use of a special wedge shaped intermediate layer is used to change the geometry of the glass and provide the optical correction needed for image reflection. In other solutions, an optical lens is manually adjusted by a technician during the manufacturing of the automobile to alter the image being projected so that the perceived image is undistorted.

However, all of the current solutions lack the ability to adjust to any changes of the projector, observer viewpoint, or changes to the windshield. Thus, when something changes after being originally set-up, the owner of the vehicle must take the vehicle in to have the system re-adjusted to accommodate the change. These limitations make the currently available HUD systems inflexible and costly.

As a result, there is a need to solve the problems of the prior art to provide a HUD system that can be adjusted in a cost efficient manner in order to gain widespread acceptance with consumers.

SUMMARY

Broadly speaking, the present invention fills these needs by providing a calibration technique that provides the data for adjusting an image prior to projection onto a warped surface so that a viewer sees the image without any distortions. It should be appreciated that the present invention can be implemented in numerous ways, including as a process, an apparatus, a system, a device, or a method. Several inventive embodiments of the present invention are described below.

In one embodiment, a method for adjusting an image projected onto a warped surface is provided. The method initiates with capturing calibration points within a calibration image projected onto the warped surface. In one embodiment the calibration image is a grid having points at vertices therein and the calibration image is captured in a digital format. The method includes analyzing the calibration points to determine relative locations among the calibration points. In one embodiment, the method utilizes a pseudo origin for locating beginning points for successive rows of calibration points. The calibration points are ordered according to the relative locations. The ordered calibration points may be applied to alter the image data prior to projection of the image data onto the warped surface.

In another embodiment, a method for determining how to modify an image projected onto a warped surface so that the image is perceived as being projected onto a non-warped surface is provided. The method includes projecting a calibration image having a pattern onto the warped surface from a first viewpoint and capturing the calibration image with effects from the warped surface. In one embodiment, the image is captured through a digital camera. The method also includes recognizing points of the pattern through analysis of the captured calibration image. In one embodiment, a top-left calibration point is located and the remaining calibration points are then located on a per row basis according to a distance and relative location of the remaining points. The located points are then ordered within an array to correspond to the pattern of the captured calibration image. Each of the method operations are repeated from a second viewpoint. Then, either the array from the first viewpoint or the array from the second viewpoint may be applied to adjust the image data being projected from a corresponding viewpoint so that the mage is perceived as being projected onto a non-warped surface.

In yet another embodiment, a system for defining relative locations of points on a curved surface is provided. The system includes an image generation device configured to project a patterned image on the curved surface and an image capture device configured to digitally capture the patterned image projected onto the curved surface. A computing system having a processor and memory is also provided. The memory includes calibration logic configured to recognize digital points of the digitally captured patterned image. The calibration logic is further configured to identify a top-left digital point of the digitally captured patterned image and order each of the remaining digital points in a top row and each successive row.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

In order to produce a de-warped image on a warped surface, a one-time calibration process is performed in accordance with the embodiments described below. This calibration process is performed for each projection, surface, and observer view instance. That is, if the projector, or image generating device, is changed or moved, or if the surface is changed or moved, or if the observer's viewpoint is moved, a new calibration process is required. In one embodiment, data from a plurality of calibration processes may be saved. In this embodiment, the saved data may be accessed in response to a change occurring, e.g., for the projector, the observer's viewpoint, etc. Thus, rather than having to manually adjust an optical lens to accommodate a changed condition, the saved calibration data may be accessed to provide a digital solution in a much more efficient manner.

As a high-level overview of the calibration process, the following operations are performed: a calibration image is projected normally, onto the warped surface. The calibration image, as projected onto the warped surface, is digitally photographed from an observer's viewpoint. The data of the digital photograph is then analyzed and processed by software having the functionality described in more detail below. The results from the processing become input data for de-warping software, also referred to as inverse warping software, which intentionally manipulates the data based on the calibration results so that a projected image modified by the de-warping software will appear non-distorted, as viewed by an observer.

Figure 1A:
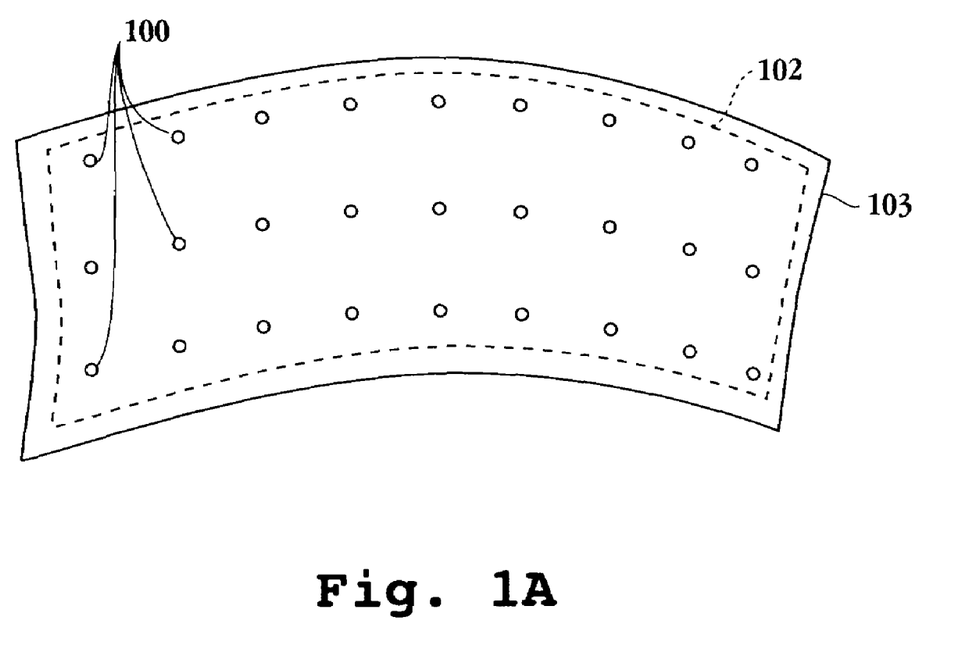
FIG. 1A is a simplified schematic diagram illustrating a grid of calibration points that may be digitally captured in accordance with one embodiment of the invention.

FIGS. 1B through 1E are simplified schematic diagrams illustrating the technique for locating each of the calibration points on the digital image in accordance with one embodiment of the invention. In FIG. 1A, a grid of digital points is provided and digitally captured. In one embodiment, the grid of digital point are projected onto a warped surface and captured by a digital camera. It should be appreciated that warped surface 103 may represent a windshield of an automobile, which has a curved surface, as well as a planar angle relative to the projector that causes a keystone effect. However, the embodiments described herein may be applied to any suitable warped surface. The surface may include a concave surface, a convex surface, or a combination of both, and the surface may have an angular slant. In one embodiment, the degree of curvature of warped surface 103 may be 45 degrees of rotation or keystoning relative to the orientation of the capture device, however, one skilled in the art will appreciate that the embodiments described herein may be adjusted to be applied to accommodate greater degrees of curvature. It should be appreciated that the calibration process described herein will function with dots/points, and that while these dots/points happen to correspond to the 4 vertices in a square (quad), this is not meant to be limiting. That is, the term vertex or vertices is not meant to limit the embodiments, as the points discussed herein with regard to the grid of digital points are one exemplary embodiment where the digital points are also vertices of rectangles within a grid.

Figure 1B:
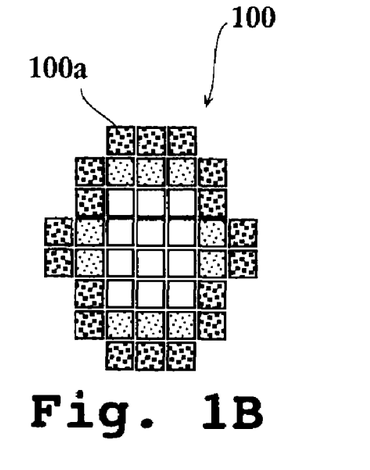
FIGS. 1B through 1E are simplified schematic diagrams illustrating the technique for locating each of the calibration points on the digital image in accordance with one embodiment of the invention.
Figure 1C:
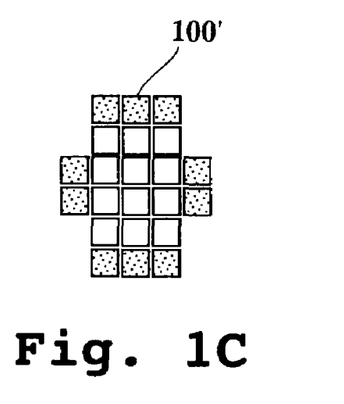
Figure 1D:
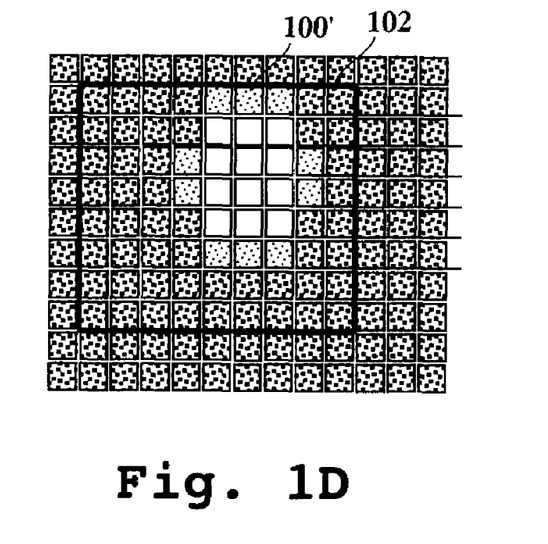

FIG. 1B illustrates a single digital point within the grid of FIG. 1, where the single digital point includes a plurality of pixels. Digital point 100 includes pixels that vary in brightness. In one embodiment, the software scans the captured digital image looking for the digital points. Locating the digital points may be achieved by comparing pixel values while scanning across the image pixels in order to locate the values that have a luminance that is above a certain threshold value. The threshold value is programmable and can be changed based on lighting conditions in accordance with one embodiment of the invention. FIG. 1B illustrates point 100 which consists of a cluster of pixels 100a. In FIG. 1C, the threshold value is used in order to eliminate the outer boundary of pixel values as the outer boundary of pixel values does not exceed the threshold value. Thus, digital point 100 is defined as point 100' in FIG. 1C after removal of the pixels having values not exceeding the threshold value. FIG. 1D is a simplified schematic diagram illustrating a region defined around a cluster 100' of pixels, 100a representing a digital point, when scanning the image in accordance with one embodiment of the invention. In FIG. 1D, once an initial pixel of the digital point is located, scanning area 102 is defined around the cluster of pixels 100a. The size of area 102 is based on mathematical calculations related to the size of the digital image in one embodiment of the invention. One skilled in the art will appreciate that numerous techniques may be used to define the size of scanning area 102. It should be noted that the area 102, which may be referred to as a grow rectangle, aids the scanning process in finding all the pixels within a given region that will define the calibration point. In addition, the embodiments described herein include the deletion, i.e., setting a pixel value to black for pixel values exceeding the threshold value, before the scanning moves to a next pixel. One skilled in the art will appreciate that if all the pixels for a given digital point 100' point are not deleted, i.e., the pixel values are not set to 0, black, or some value below the threshold value, then these pixels will be seen again during the scanning process when they result in duplicate or ghost pixels.

Figure 1E:
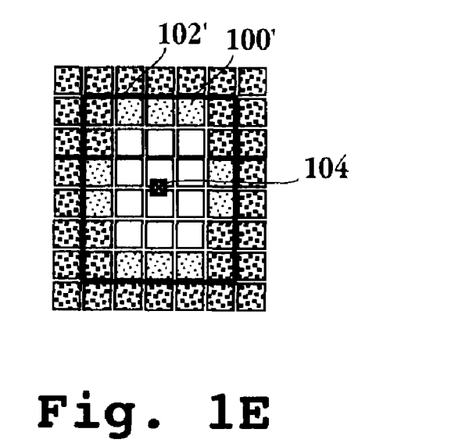

FIG. 1E illustrates the cluster of pixels having a center point defined after completion of the scanning for an entire cluster of pixels accordance with one embodiment of the invention. In FIG. 1E, cropping box 102' is defined around the cluster 100' of pixels. Cropping box 102' represents the extent of digital point 100. From cropping box 102', the software calculates center point 104 of the cluster. This center point is then used as the relative coordinate of the digital point 100'. The coordinate of digital point 100' is added to an array of calibration coordinates and stored. The process continues as each digital point is located in the calibration grid and the array grows as each of these digital points are found through the scanning mentioned above with respect to FIGS. 1B through 1E.

As discussed above, the calibration image consists of an array of dots (or points), uniformly spaced in a grid pattern in one exemplary embodiment. Typically, the point spacing is one of 16 or 32 pixels, which are the two most common block sizes. The calibration image can be a static bitmap or generated by software. For a typical display resolution of 640 pixels width by 480 lines high, the region is divided evenly into a grid, using a block size of 16 or 32. For example, if a 32 pixel block size is used, then there will be 21 points horizontally and 16 points vertically. This example will produce a total of 336 points in the calibration image.

It should be noted that even though 640/32=20 and 480/32=15, one extra column of points is added at the right-most edge to bring the horizontal total to 21 and one extra row of points is added at the bottom-most edge to bring the vertical total to 16. The extra row/column of points effectively represents the very edges of the image, and some software adjustment is required to logically shift them slightly "off image". This will be covered in more detail below. The software analyzes the digital photograph, and attempts to locate all the points that were "seen" as projected on the warped surface. It should be appreciated that the digital photograph will not contain any pixels that are brighter than the projected calibration points, as these points will be recognized by the software. The calibration points as projected onto the warped surface and viewed by the digital camera are the brightest objects in the digital photograph, when the calibration points are identified through their intensity or luminance. As mentioned above, the position of the array of calibration points within the digital photograph is not important, as the calibration software is interested in the relative positions of the calibration points. Since the original projected calibration image is known, the calibration software finds all the points and sequences them in the correct order. The absolute coordinates of the calibration points are converted to relative coordinate which are then subsequently processed by the de-warping software, as discussed below. Thus, with regard to FIGS. 1B-1E, when the scanning is complete and the grid of the above example was used, there should be 336 points in the array. If there are not 336 points in the final array, the luminance threshold can be altered and the scanning process repeated.

Figure 2:
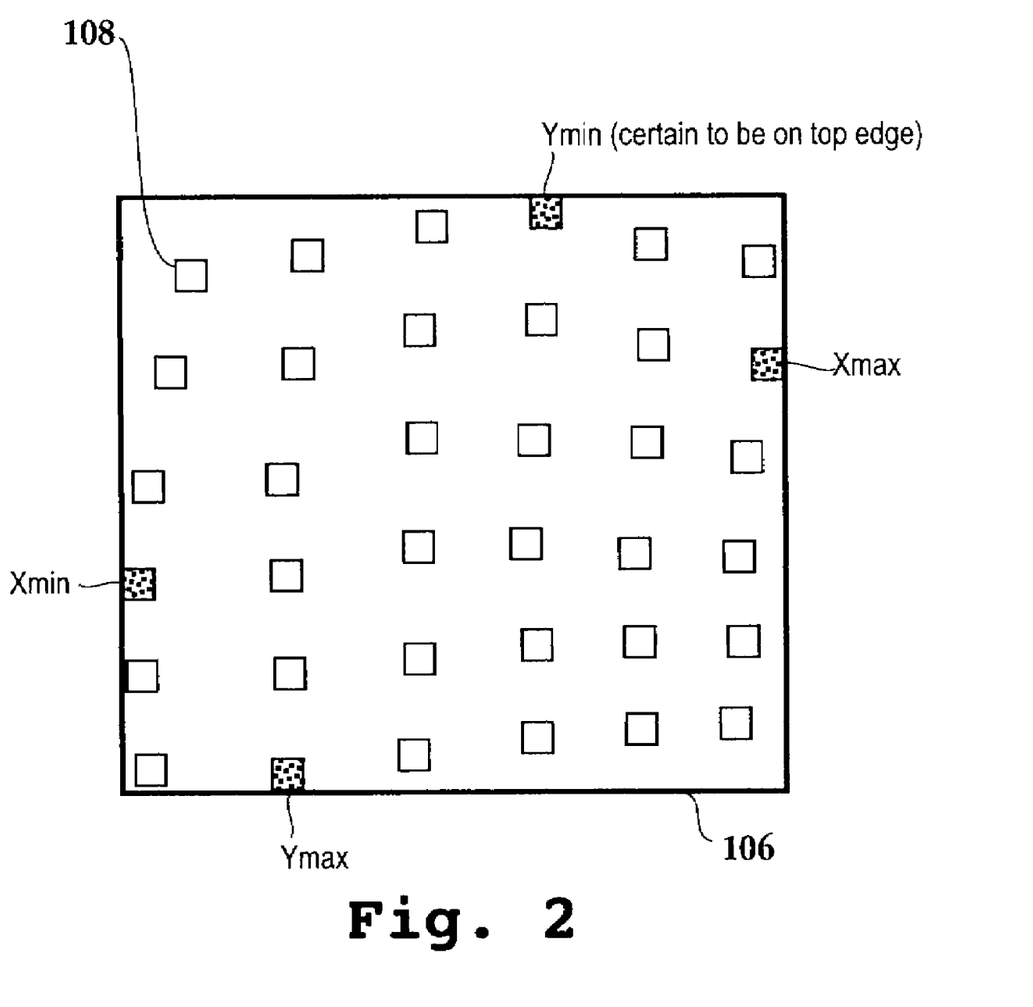
FIG. 2 is a simplified schematic diagram illustrating a portion of the technique for locating a top-left calibration point or the scanned array in accordance with one embodiment of the invention.

FIG. 2 is a simplified schematic diagram pictorially illustrating the technique for locating maximum and minimum X and Y coordinates of a stored array to assist in locating a top-left calibration point or the scanned array in accordance with one embodiment of the invention. In FIG. 2, bounding box 106 is effectively created around the array of calibration points. It should be appreciated that to locate the top-left calibration point in the array in order to organize the array of points, the point at $Y_{min}$ is important. That is, the calibration point, or digital point, found at $Y_{min}$ is guaranteed to be located on a top row of the array of digital points within bounding box 106. As the software is not aware yet which point on the top row this is, a scanning process is initiated to move from the current point at $Y_{min}$ to a top-left point 108.

Figure 3:
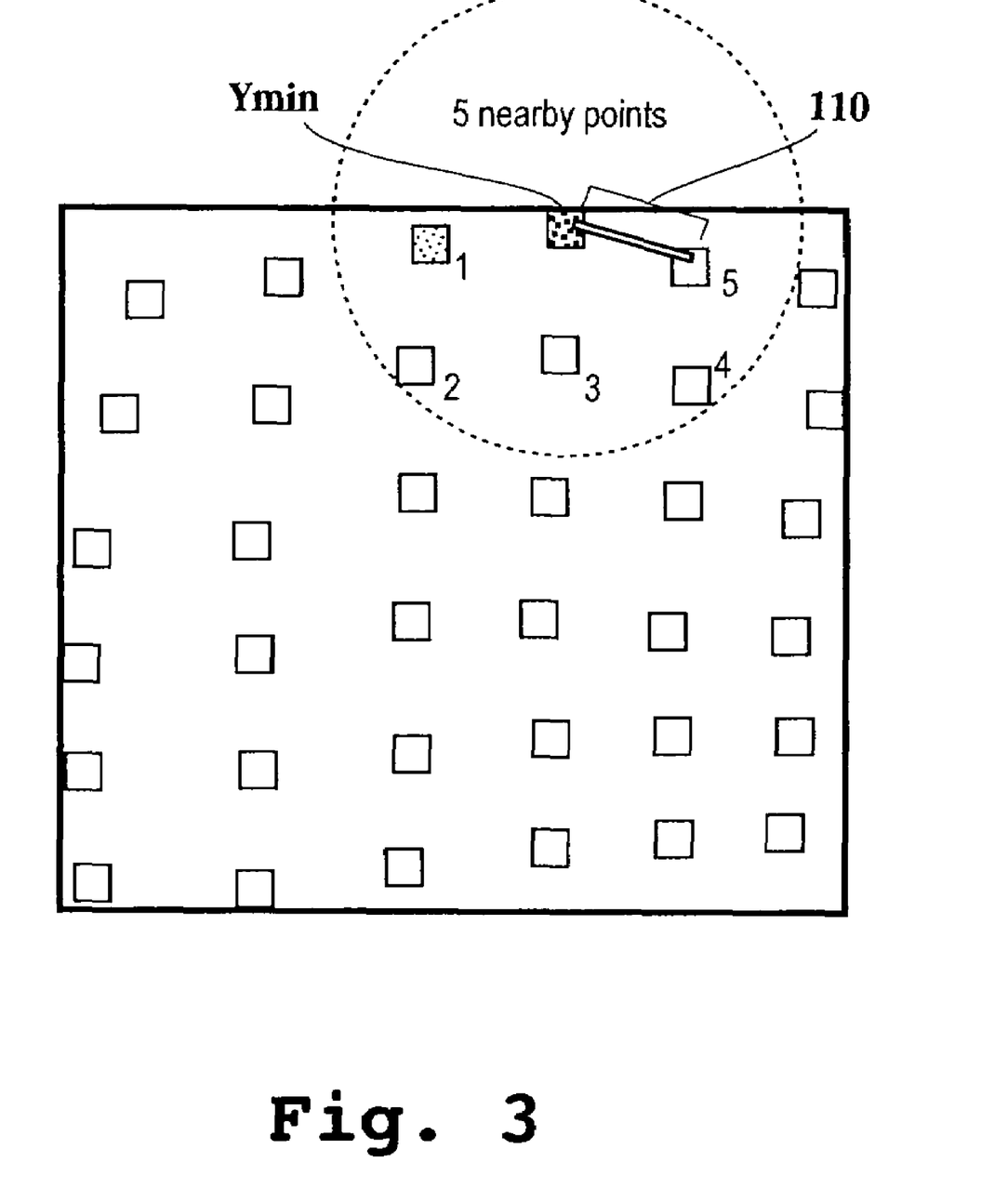
FIG. 3 is a simplified schematic diagram illustrating the location of the neighborhood of points in order to walk towards the top-left point of the array of digital points.

FIG. 3 is a simplified schematic diagram illustrating the location of the neighborhood of points in order to walk towards the top-left point of the array of digital points in accordance with one embodiment of the invention. The algorithm measures a distance to a nearest point in the array from the point located at $Y_{min}$. Once this distance (D) is known, a radius of about 1.8 times D is used to define a neighborhood of points nearby the current point. It will be apparent to one skilled in the art, that the multiple of 1.8 may be modified based on a number of variables and that the multiple is not meant o be limited to a value of 1.8. The algorithm then determines all the neighboring digital points within D 110, i.e., points 1-5 and selects a point that is to the left of $Y_{min}$, i.e., point 1. This point may be selected as the point having the smallest Y coordinate and an X coordinate that is less than the $Y_{min}$ of the neighborhood of points. It should be appreciated that this process is continued from point 1 until the top-left point is located. As will be explained in more detail below, the algorithm may count the number of neighboring points within the radius and may stop scanning if the number of points is less than a threshold value.

Figure 4:
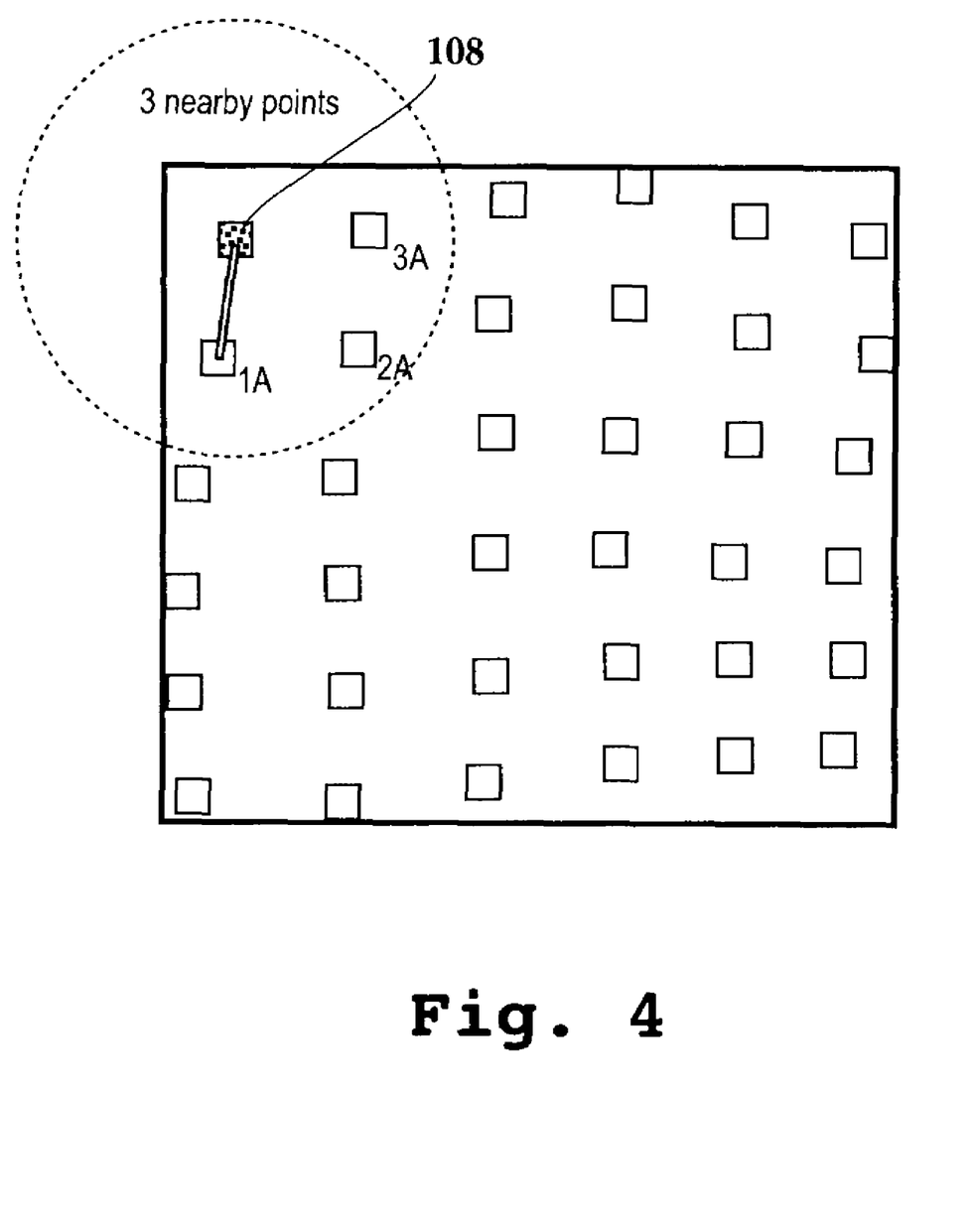
FIG. 4 is a simplified schematic diagram illustrating the location of a top-left point in accordance with one embodiment of the invention.

FIG. 4 is a simplified schematic diagram illustrating the location of a top-left point in accordance with one embodiment of the invention. Here, the algorithm has located point 108 and when the number of neighboring points within the radius is counted, points 1A-3A are identified. If the number of points is less than or equal to three, the software stops the scanning and considers the current point to be the desired top-left point. That is, in reaching the top-left point the number of nearby points drop, i.e., from five to three as there are no more columns to the left of point 108, thereby indicating that a top-left point has been reached.

Figure 5A:
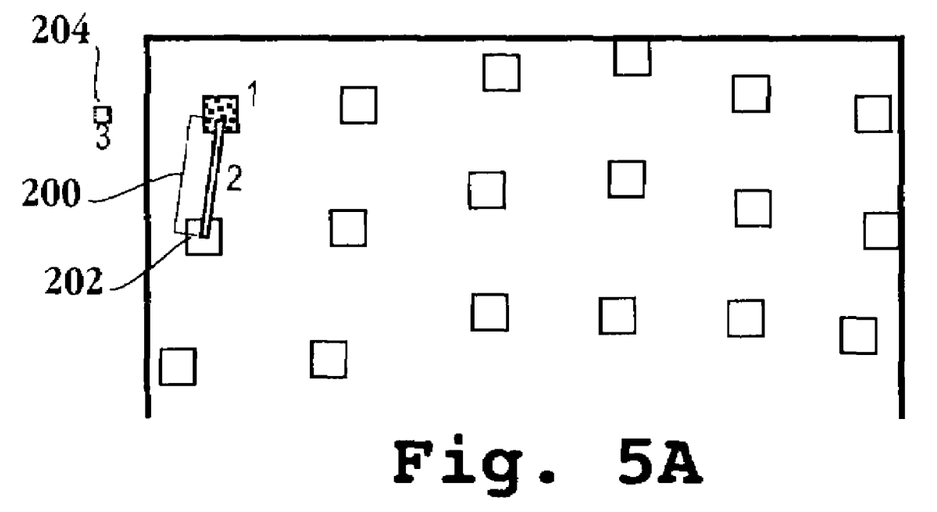
FIGS. 5A and 5B illustrate a technique for ordering the array of points once the top-left point has been located.
Figure 5B:
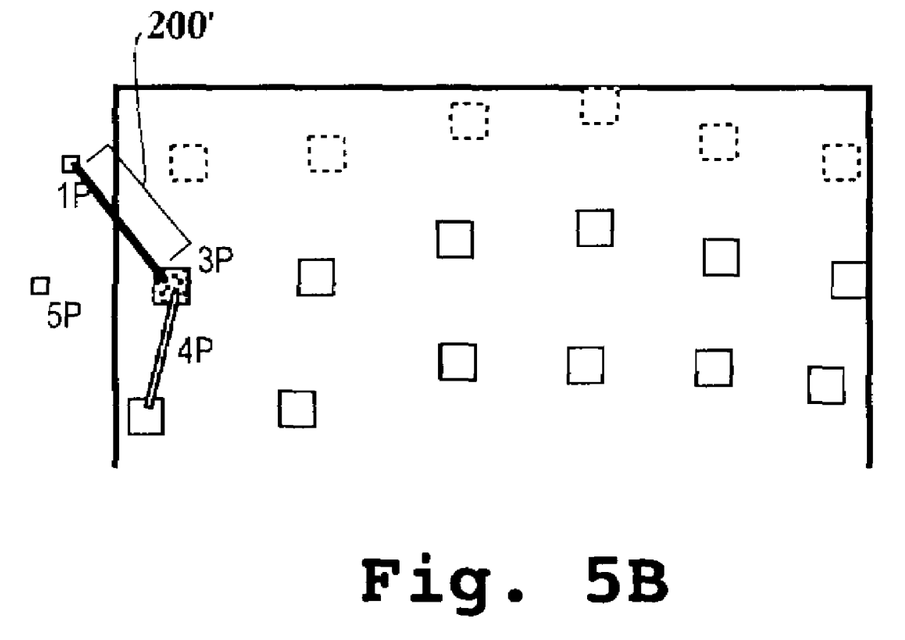

FIGS. 5A and 5B illustrate a technique for ordering the array of points once the top-left point has been located in accordance with one embodiment of the invention. The array of calibration points is effectively unordered. The unordered array is copied into a new ordered array that is ordered from left to right, top to bottom (same as reading English). As the points are copied from the unordered array into the ordered array, a pseudo origin is created at the beginning of each row. The pseudo origin is created at the beginning of each row to help locate the left most point of each successive row as the array is processed and ordered. In FIG. 5A, point 1 and a distance 200 to a nearest point 202 is calculated. The distance 200 is subtracted from the X coordinate of point 1 to define a pseudo origin 204 (point 3) that is used as the initial origin for the next row, once the top row has been ordered. Pseudo origin 204 becomes the next row's first point. On subsequent rows, pseudo origin 204 is used and the distance 200' to the nearest point (3P) is calculated as illustrated in FIG. 5B. The nearest point (3P) becomes the row's first point. Before scanning this row, distance (4P) is calculated and a new pseudo origin (5P) is created for subsequent rows. Therefore, for each row, a new pseudo origin is calculated. This process ensures that the first point of each row is found reliably, as the first point of each row should be the closest point to the pseudo origin. It should be appreciated that the use of the pseudo origin minimizes the possibility of incorrectly identifying a starting point of a next row.

Figure 6A:
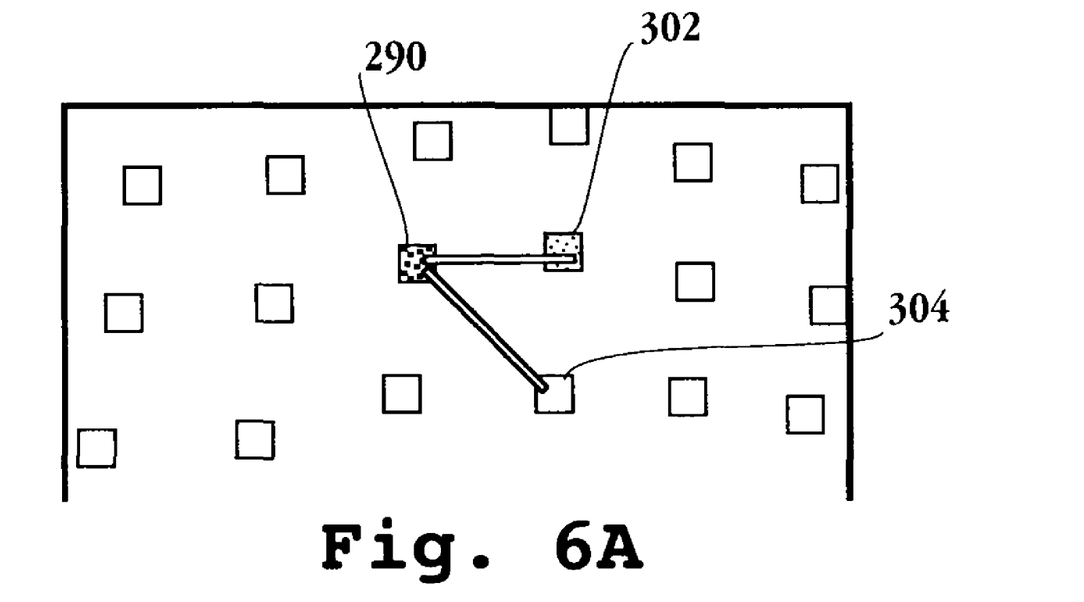
FIGS. 6A and 6B illustrate the scanning process within a row once the first point within the row has been located as defined through FIGS. 5A and 5B.
Figure 6B:
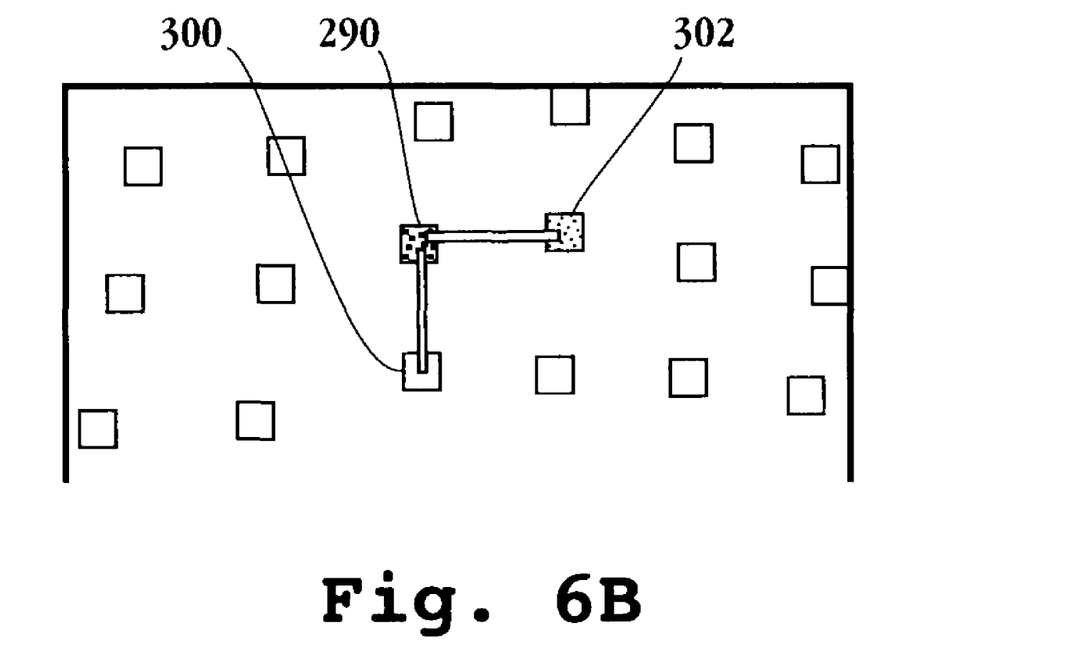

FIGS. 6A and 6B illustrate the scanning process within a row once the first point within the row has been located in accordance with one embodiment of the invention. In essence, the embodiments of FIGS. 6A and 6B walk across a current row moving left to right. The algorithm essentially locates points which are to the right of the current point and that have the smallest Y value. As each point within a row is located, the point is moved from the unordered array in which it was initially stored, to an ordered array and the point then becomes the current point and the process continues across the row. In FIG. 6A, for each current point the two closest points 302 and 304 are identified. It should be appreciated that as a row is walked from left to right, sometimes a point 300 may be located to the right of a current point 290 as illustrated in FIG. 6B. In this instance as described above, points 300 and 302 are identified. However, the software selects a point which is to the right of point 290 and has the smallest Y value, which would be point 302. As points are found, they are removed from the unordered array. Therefore, once a point has been found and moved to the ordered array, it will no longer interfere with the scanning process. Once all the rows are scanned, all the points will have been moved into the ordered array and the unordered array will be empty and is no longer used.

Figure 7A:
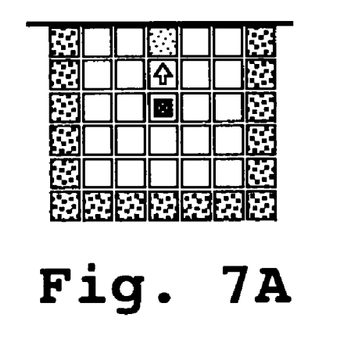
FIGS. 7A through 7D illustrate the adjustment of edge boundary points in accordance with one embodiment of the invention.
Figure 7B:
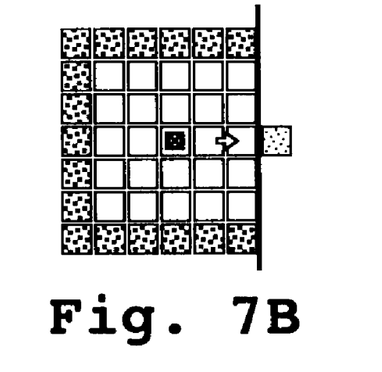
Figure 7C:
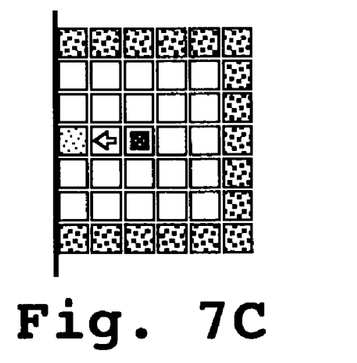
Figure 7D:
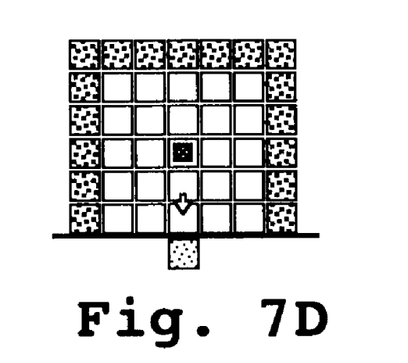

FIGS. 7A through 7D illustrate the adjustment of the edge boundary points in accordance with one embodiment of the invention. It should be appreciated that the original calibration image contains edge points that are slightly off of being in their correct positions. This edge skewing is done so that the digital camera or device capturing a digital image of the calibration grid can reliably resolve all the points near the four edges. If these points were not skewed, then the top row and left edge points would be very faint and the bottom row and right edge points would not even be visible (since they are logically off-image). Since the amount of edge skew and the calibration image is known to the calibration software, the skew can be corrected in order to compensate for any offset from this skew. That is, the calibration image contains points that consist of a 3×3 pixel cluster in one embodiment. The top row and left edge points are skewed by one pixel as illustrated in FIGS. 7A and 7C, while the bottom row and right edge are skewed by two pixels as illustrated in FIGS. 7B and 7D. The Y coordinates of the points in the top row are adjusted upwards by ⅓ a point size (see FIG. 7A). The X coordinates of the points in the left column are adjusted left by ⅓ a point size (see FIG. 7C). The X coordinates of the points in the right column are adjusted right by ⅔ a point size (see FIG. 7B). The Y coordinates of the points in the bottom row are adjusted downwards by ⅔ a point size (see FIG. 7D). Therefore, the top and left points can be adjusted by one-third of a point size, and the bottom and right points can be adjusted by two-thirds of a point size.

These edge adjustments are made in-place on the points in the ordered array in one embodiment of the invention. The adjustments are orthogonal only (no consideration to angle is given), but the adjustments are so slight that the lack of consideration to the angle is negligible. The adjustment of the edges helps improve the warp grid at the edges by predicting approximately where each edge point should be since the edge points were skewed in the calibration image.

Figure 8:
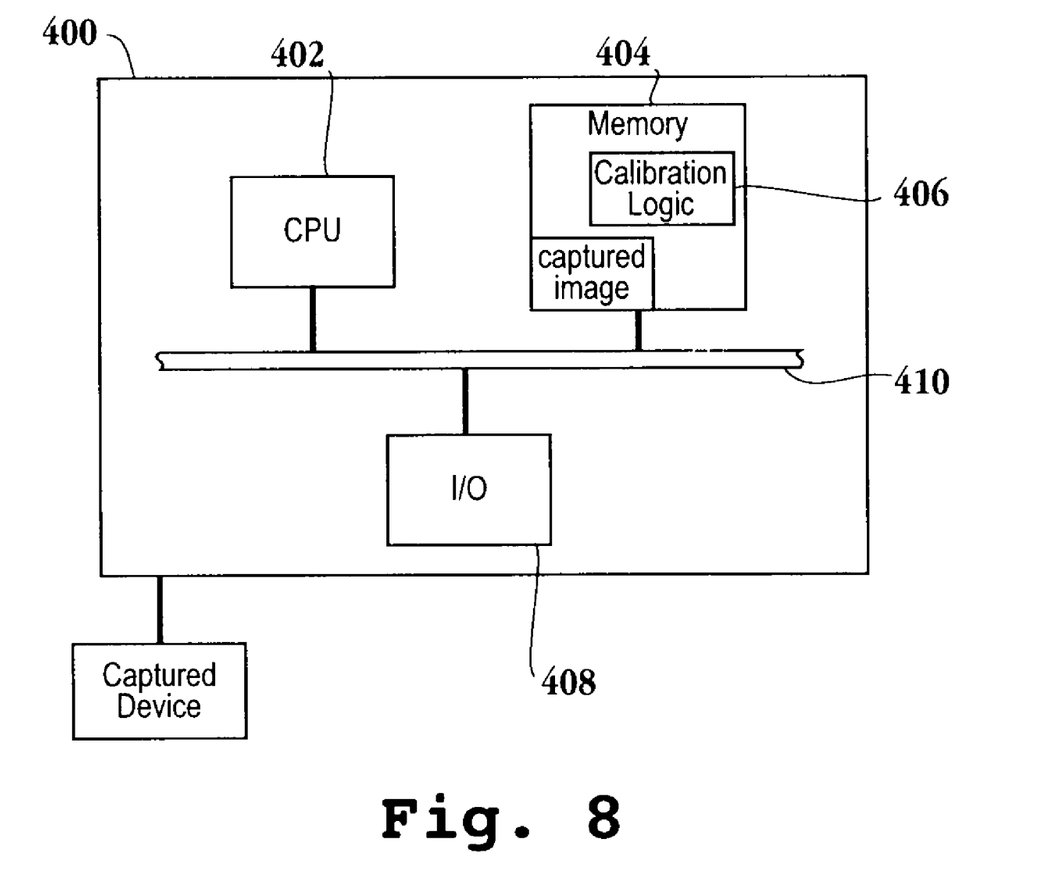
FIG. 8 is a simplified schematic diagram of a system capable of performing the embodiments described herein in accordance with one embodiment of the invention.

FIG. 8 is a simplified schematic diagram of a system capable of performing the embodiments described herein in accordance with one embodiment of the invention. Chip 400 includes central processing unit (CPU) 402, memory 404 and input/output module 408. CPU 402, memory 404, and input/output module 408 are in communication with each other over bus 410. Memory 404 includes calibration logic 406. Calibration logic 406 includes program instructions capable of performing the functionality described herein in one embodiment. Calibration logic 406 may be software, hardware or some combination of both. In addition, the calibration logic may be integrated onto a processing chip, such as a graphics processor or a chip for generating a HUD in one embodiment. Alternatively, the calibration logic may incorporated into a stand-alone device, i.e., not be integrated into the HUD module. One skilled in the art will appreciate that the device/apparatus can have many configuration and that any of these configurations may be used with the embodiments described herein to provide the functionality to analyze a warped surface for the effects of an image projected thereon. In one embodiment, chip 400 may be incorporated onto and image capture device, such as a digital camera. Of course, the incorporation into the digital camera is not necessary as the digital image captured by a capturer device may be provided to a computing system containing chip 400.

Figure 9:
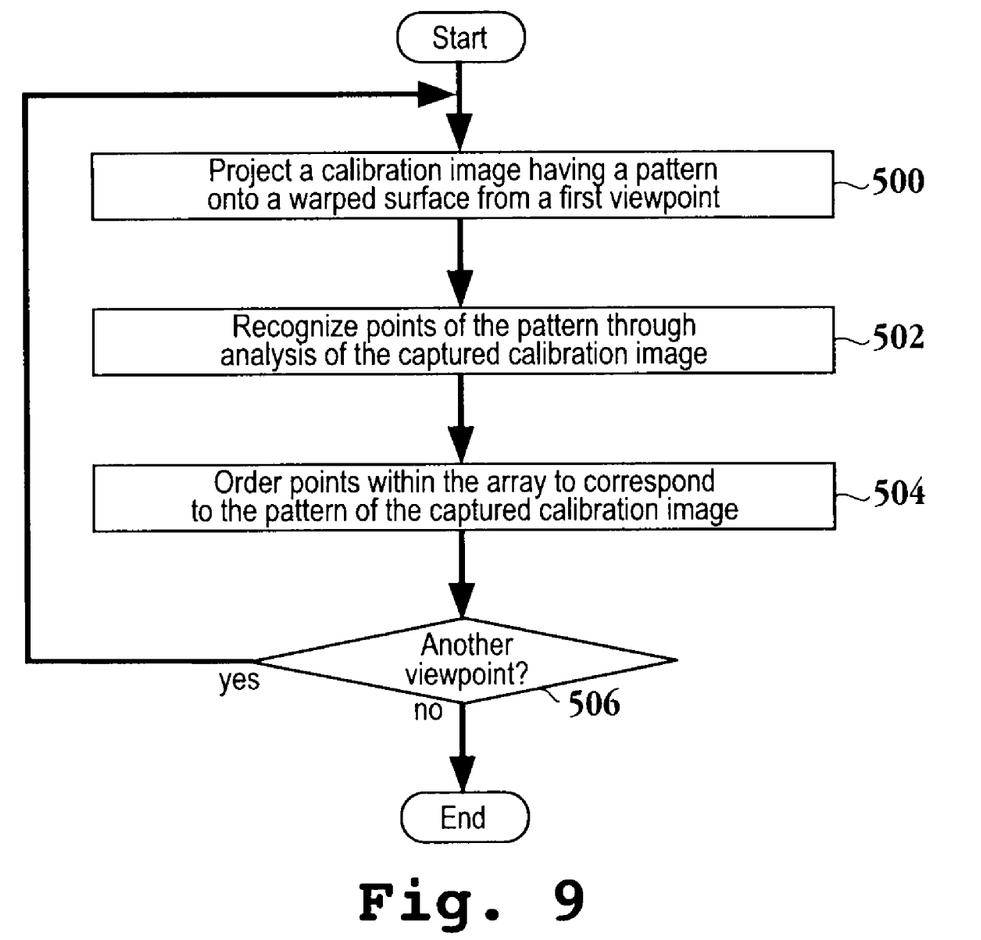
FIG. 9 is a flow chart diagram illustrating the method operations for determining how to modify an image projected onto a warped surface so that the image is perceived as being projected onto anon-warped surface.

FIG. 9 is a flow chart diagram illustrating the method operations for determining how to modify an image projected onto a warped surface so that the image is perceived as being projected onto a non-warped surface. The method initiates with operation 500 where a calibration image having a pattern is projected onto the warped surface from a first viewpoint. Here, the calibration image may be a series of dots in a grid format, where each dot is a vertex of a geometrical shape of the grid, as described above with regard to FIG. 1B through 1E. The calibration image is then captured with the effects from the warped surface appearing therein. For example, a digital camera may be used to photograph the calibration image that is projected onto the warped surface. The method then advances to operation 502 where points of the pattern are recognized through analysis of the captured calibration image. In one embodiment, the pixel values are scanned and compared to a threshold luminance value as described above with regards to FIGS. 1B through 1E. The method then proceeds to operation 504 where the points within the array are ordered to correspond to the pattern of the captured calibration image. It should be appreciated that in this operation, the top-left calibration point is located and each row is walked across as described above with regard to FIGS. 4 through 6. As mentioned above, a pseudo origin may be defined to assist with ordering the array of points. In addition, each row of data may be walked across as discussed above. Multiple calibrations may be performed by repeating each of the method operations in operation 506 in order to capture numerous viewpoints or altered warped surfaces, etc.

The ordered array contains the calibration point coordinates in the digital photograph world space. Typically, a new bounding box is calculated and then all the coordinates are adjusted to a new virtual origin that is the top-left corner of the bounding box. Then all the coordinates are scaled from the digital photograph scale to the image scale (typically 640× 480). Finally, the coordinates are converted to offsets (deltas) in one embodiment, which can be done since the software knows the actual coordinates for each calibration point. These steps are subjective as both the calibration software and the de-warping software, which may use the calibration data as described in co-pending U.S. application Ser. No. 11/550, 153, has knowledge of the calibration image and knows where each calibration point is located. That is, it will be apparent to one skilled in the art that there are numerous options as to how the calibration data is handed off to the de-warping software.

Figure 10:
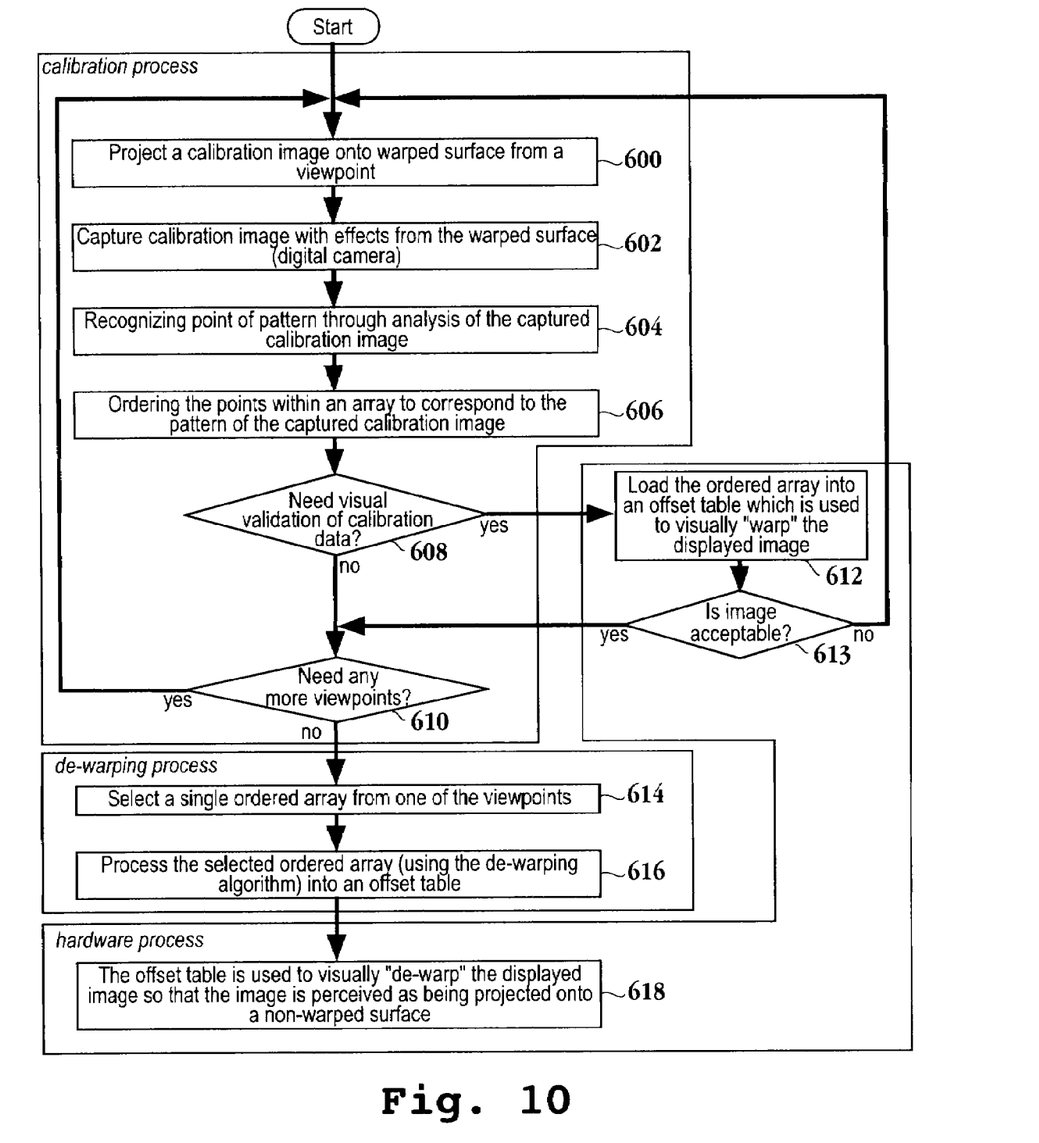
FIG. 10 is a high level flowchart diagram illustrating where the calibration technique described above fits within the overall processing for a Heads Up Display (HUD) unit in accordance with one embodiment of the invention.

FIG. 10 is a high level flowchart diagram illustrating where the calibration technique described above fits within the overall processing for a Heads Up Display (HUD) unit in accordance with one embodiment of the invention. The method initiates with operation 600, where the calibration image is projected onto a warped surface from a viewpoint. The method then advances to operation 602, where the calibration image is captured along with the effects from the warped surface. As mentioned above with regard to FIGS. 1A and 9, any pattern of digital points may be captured digitally, and FIG. 1A provides one exemplary pattern of digital points. The method then proceeds to operation 604, where the digital points of the captured image are recognized through analysis of the captured image data. As discussed above, with regard to FIGS. 2-9, the digital points are organized into an ordered array for eventual use in a de-warping process, for example. In operation 608 it is determined whether visual validation of the calibration data is necessary. If a visual validation is needed then the ordered array is loaded into an offset table which is used to warp a displayed image and the visual validation may occur as illustrated in operation 612. If it is determined that the visual validation is not needed in operation 608, then the method proceeds to operation 610, where it is determined if more viewpoints are desired. For example, with regard to a driver of a vehicle, different seat positions may correspond to different viewpoints. In addition, different driver heights may result in different viewpoints. It should be appreciated that any number of different viewpoints may be captured by moving the device projecting the image on to the warped surface. If additional viewpoints are needed, then the method returns to operation 600 and repeats as described above. If no additional viewpoints are needed, then the method moves to operation 614. The visual validation determines whether the displayed image is acceptable as specified in decision operation 613. If the displayed image is acceptable, the method proceeds to operation 610. If the displayed image is not acceptable the method returns to operation 600 and repeats as described above.

Still referring to FIG. 10, in operation 614 an ordered array from one of the ordered arrays resulting from the calibration process (when there are more than one), is selected. The selected ordered array is then processed using de-warping algorithms into an offset table in operation 616. Further details on the de-warping process and operation 614 and 616 may be found in U.S. application Ser. No. 11/550,153, which has been incorporated by reference. From operation 616, the method advances to operation 618, where the offset table is used to visually de-warp the displayed image so that the image is perceived as being projected onto a non-warped surface. As illustrated in FIG. 10, operations 612 and 618 occur within the hardware process. The calibration process, illustrated in operations 600-610, essentially captures the nature of a warped (non-flat, non-square) surface, samples regions of that surface at equal intervals, leading to an approximate numerical quantification of the surface. By noting the positions of the control points on the surface, it should be noted that it is possible to approximate the distortions the surface causes by interpolating all the pixels that are within each region bounded by four control points, e.g., the quads.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for adjusting an image projected onto a warped surface, comprising method operations of:
   capturing calibration points within a calibration image projected onto the warped surface;
   analyzing the calibration points to determine relative locations among the calibration points;
   ordering the calibration points according to the relative locations; and
   applying the ordered calibration points to alter the image prior to projection onto the warped surface; and wherein
   ordering the calibration points according to the relative locations includes,
   defining a pseudo origin proximate to a leftmost point of a top row for use in locating a leftmost point of a next row; and
   repeating the defining for successive rows; and wherein
   ordering the calibration points according to the relative locations includes,
   a) identifying a calibration point having a minimum Y coordinate;
   b) determining a distance between the calibration point having a minimum Y coordinate and a point nearest to the calibration point having a minimum Y coordinate;
   c) identifying all calibration points within a multiple of the distance; and
   d) determining which of the calibration points within the multiple of the distance has an X coordinate that is less than the X coordinate of the calibration point and a smallest Y coordinate value.

2. The method of claim 1, further comprising:
   applying the ordered calibration points to adjust the image being projected onto the warped surface.

3. The method of claim 1, wherein the method operation of capturing calibration points within a calibration image projected onto the warped surface includes,
   digitally photographing the calibration image from an observer's viewpoint.

4. The method of claim 1, wherein the method operation of analyzing the calibration points to determine relative locations among the calibration points includes,
   scanning the calibration image to locate each of the calibration points; and
   adding coordinates representing locations for each of the calibration points to an array.

5. The method of claim 4, wherein the method operation of scanning the calibration image to locate each of the calibration points includes,
   locating a pixel value having a luminance value greater than a threshold value;
   defining a region surrounding a pixel corresponding to the pixel value;
   identifying each pixel having a luminance value greater than the threshold value in the region;
   calculating a cropping box surrounding all identified pixels, the cropping box defined within the region;
   identifying a center of the cropping box; and
   assigning coordinates of the center of the cropping box for one of the calibration points.

6. The method of claim 5, wherein a value for each pixel having a luminance greater than the threshold value is reset below the threshold value after identification.

7. The method of claim 1, further comprising:
   continuing a)-d) until all calibration points within a multiple of the distance are less than a calibration point threshold.

8. The method of claim 7 wherein the calibration point threshold is less than or equal to three.

9. The method of claim 1, further comprising:
walking each row to determine relative locations of calibration points within a corresponding row, wherein as each of the calibration points within the corresponding row are located, respective calibration point identifiers are moved from an unordered array to an ordered array.

10. The method of claim 1, wherein the method operation of ordering the calibration points according to the relative locations includes,
transferring data representing relative locations of the calibration points determined through the analyzing from an unordered array to an ordered array; and
converting the data representing the relative locations in the ordered array to offsets from coordinates of the calibration points.

11. The method of claim 1, wherein the method operation of ordering the calibration points according to the relative locations includes,
adjusting coordinates of calibration points along outer edges of the projected image to compensate for edge skew introduced due to addition of an extra column and an extra row to the captured calibration points.

12. A chip used for a system that applies a plurality of calibration points and adjusts an image, the chip comprising:
calibration logic that:
locates a pixel value having a luminance value greater than a threshold value;
defines a region surrounding a pixel corresponding to the pixel value;
identifies each pixel in the region having a luminance value greater than the threshold value;
calculates a cropping box surrounding all identified pixels, the cropping box defined within the region;
identifies a center of the cropping box to assign coordinates of the center of the cropping box for one of the calibration points;
analyzes the calibration points to determine relative locations among the calibration points;
orders the calibration points according to the relative locations; and
applies the ordered calibration points to alter the image prior to projection onto the warped surface; and wherein
ordering the calibration points according to the relative locations includes,
defining a pseudo origin proximate to a leftmost point of a top row for use in locating a leftmost point of a next row; and
repeating the defining for successive rows; and wherein ordering the calibration points according to the relative locations includes,
a) identifying a calibration point having a minimum Y coordinate;
b) determining a distance between the calibration point having a minimum Y coordinate and a point nearest to the calibration point having a minimum Y coordinate;
c) identifying all calibration points within a multiple of the distance: and
d) determining which of the calibration points within the multiple of the distance has an X coordinate that is less than the X coordinate of the calibration point and a smallest Y coordinate value.

13. A system that applies a plurality of calibration points and adjusts an image, the system comprising:
calibration logic that:
locates a pixel value having a luminance value greater than a threshold value;
defines a region surrounding a pixel corresponding to the pixel value;
identifies each pixel in the region having a luminance value greater than the threshold value;
calculates a cropping box surrounding all identified pixels, the cropping box defined within the region;
identifies a center of the cropping box to assign coordinates of the center of the cropping box for one of the calibration points;
analyzes the calibration points to determine relative locations among the calibration points;
orders the calibration points according to the relative locations; and
applies the ordered calibration points to alter the image prior to projection onto the warped surface; and wherein
ordering the calibration points according to the relative locations includes,
defining a pseudo origin proximate to a leftmost point of a top row for use in locating a leftmost point of a next row; and
repeating the defining for successive rows; and wherein ordering the calibration points according to the relative locations includes,
a) identifying a calibration point having a minimum Y coordinate:
b) determining a distance between the calibration point having a minimum Y coordinate and a point nearest to the calibration point having a minimum Y coordinate;
c) identifying all calibration points within a multiple of the distance: and
d) determining which of the calibration points within the multiple of the distance has an X coordinate that is less than the X coordinate of the calibration point and a smallest Y coordinate value.

* * * * *